Oct. 27, 1953 R. H. EBSWORTH 2,656,736
AUTOMATIC TRANSMISSION
Filed Aug. 20, 1949 3 Sheets-Sheet 1

Inventor
Richard H. Ebsworth
By Lyon & Lyon
Attorneys

Oct. 27, 1953    R. H. EBSWORTH    2,656,736
AUTOMATIC TRANSMISSION
Filed Aug. 20, 1949    3 Sheets-Sheet 2

Inventor
Richard H. Ebsworth
By Lyon & Lyon
Attorneys

Oct. 27, 1953     R. H. EBSWORTH     2,656,736
AUTOMATIC TRANSMISSION
Filed Aug. 20, 1949     3 Sheets-Sheet 3
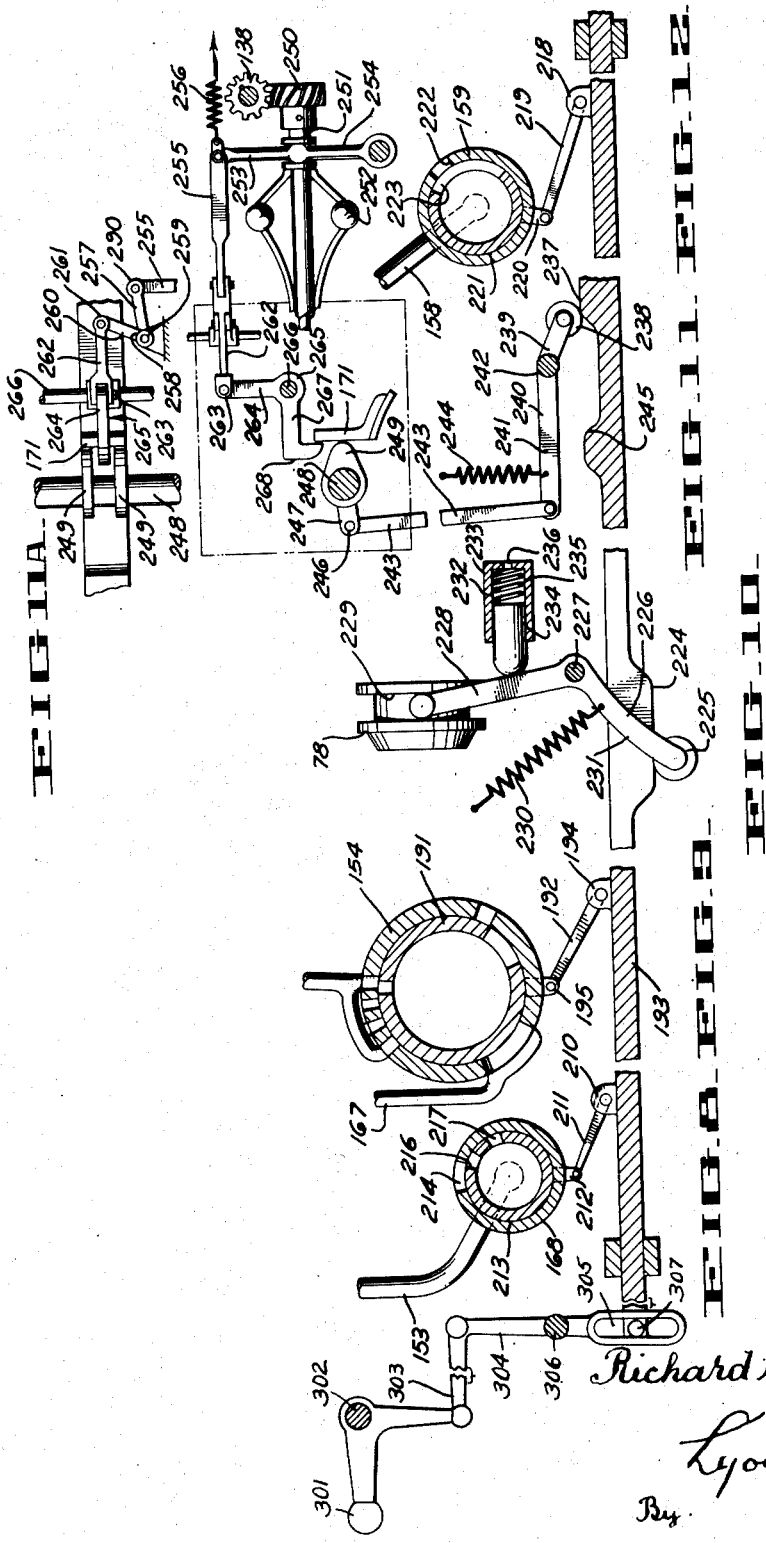
Inventor
Richard H. Ebsworth
By Lyon & Lyon
Attorneys Patented Oct. 27, 1953

2,656,736

UNITED STATES PATENT OFFICE 2,656,736

AUTOMATIC TRANSMISSION

Richard H. Ebsworth, Laguna Beach, Calif.

Application August 20, 1949, Serial No. 111,490

23 Claims. (Cl. 74—752)

This invention relates to a hydraulic drive or power transmission of the type designed particularly for use on motor vehicles.

This invention contemplates a hydraulic transmission or drive in which the torque from the drive shaft of the engine passes in a two-path power flow to two members of a planetary gearset, the third member of which passes the torque to the driven tail shaft and comprises a combination of hydraulic coupling with planetary gearing in a novel manner to achieve a more extended range of power ratios both in drive and in engine braking.

Accordingly, it is one object of this invention to provide means whereby the differential action of the two-path power flow is brought into the immediate control of the driver. Under the control of the operator the rotation of the planetary gear is regulated to any desired degree through the application of a controlled variable resistance. This controlled relative resistance is provided by a pump preferably in the form of a gear pump, which pump is itself actuated by the fluid driven member. By controlling the outlet from said member the volume of fluid expelled from the pump and consequently its speed of rotation is controlled. Inasmuch as the pump is driven by the fluid driven member a control of the rotation of the pump serves automatically to control the rotation of the fluid driven member. Either the sun or the annulus of the first planetary gearset may be chosen as the unit to be directly driven, but in the embodiment shown, which is the preferred construction the direct drive is to the annulus and the sun is driven by the hydraulic drive.

The planets thus receive torque from the annulus, revolve the sun backwards, initially at a speed which is determined by the resistance of the front resistance pump, the planet carrier being revolved forwardly at a rate depending upon the relative sizes of the gears. Between the range limits set by the gears, a curved acceleration is provided by the gear set which means an infinity of ratios within said range.

It is a further object of this invention to also provide a full ratio of gearing within the limits set by the size of the gears for engine braking. This is achieved by the use of a second resistance pump driven in connection with the tail shaft as hereinafter described.

A further object of this invention is to provide an automatic parking brake which inescapably is applied when the engine ceases running, thus it is unnecessary to move the hand lever into a special parking position as is common with many of the hydraulic transmissions now offered.

It is a further object and feature of this invention that means are employed which render the automatic braking feature above-described inoperative when the automobile is in motion even though the engine may fail.

It is a further object of this invention to provide means to permit free wheeling and also to make such means inoperative in the engine braking range.

It is a further object and feature of this invention that despite the application of the automatic brake the engine can be started and raced to warm it up without creeping simply by the disconnection of the synchromesh clutch.

It is a further object of this invention to provide a quiet running, long lived and simple mechanism which by the use of planetary gearing is free from the difficulties inherent in gear boxes which require gear changing, nor does the transmission of this device depend upon speed sensitive devices such as a governor or centrifugally operated valve or on automatic controls which are actuated by opposing hydraulic pressures.

These and other objects and advantages of the present invention will be apparent from the annexed specification in which:

Figures 8, 9, 10, 11 and 12 illustrate schematically the rocker shaft operating the control units of the hydraulic drive.

Figure 8 illustrates the control of the front resistance pump.

Figure 9 illustrates the control of the control cylinder shown in Figure 6.

Figure 10 illustrates the control of the synchromesh clutch.

Figure 11 illustrates the control of the brake shoe.

Figure 11A is a view partly in plane and partly in section of the brake control apparatus.

Figure 12 illustrates the control of the gear resistance pump shown in Figure 5.

Figure 1:
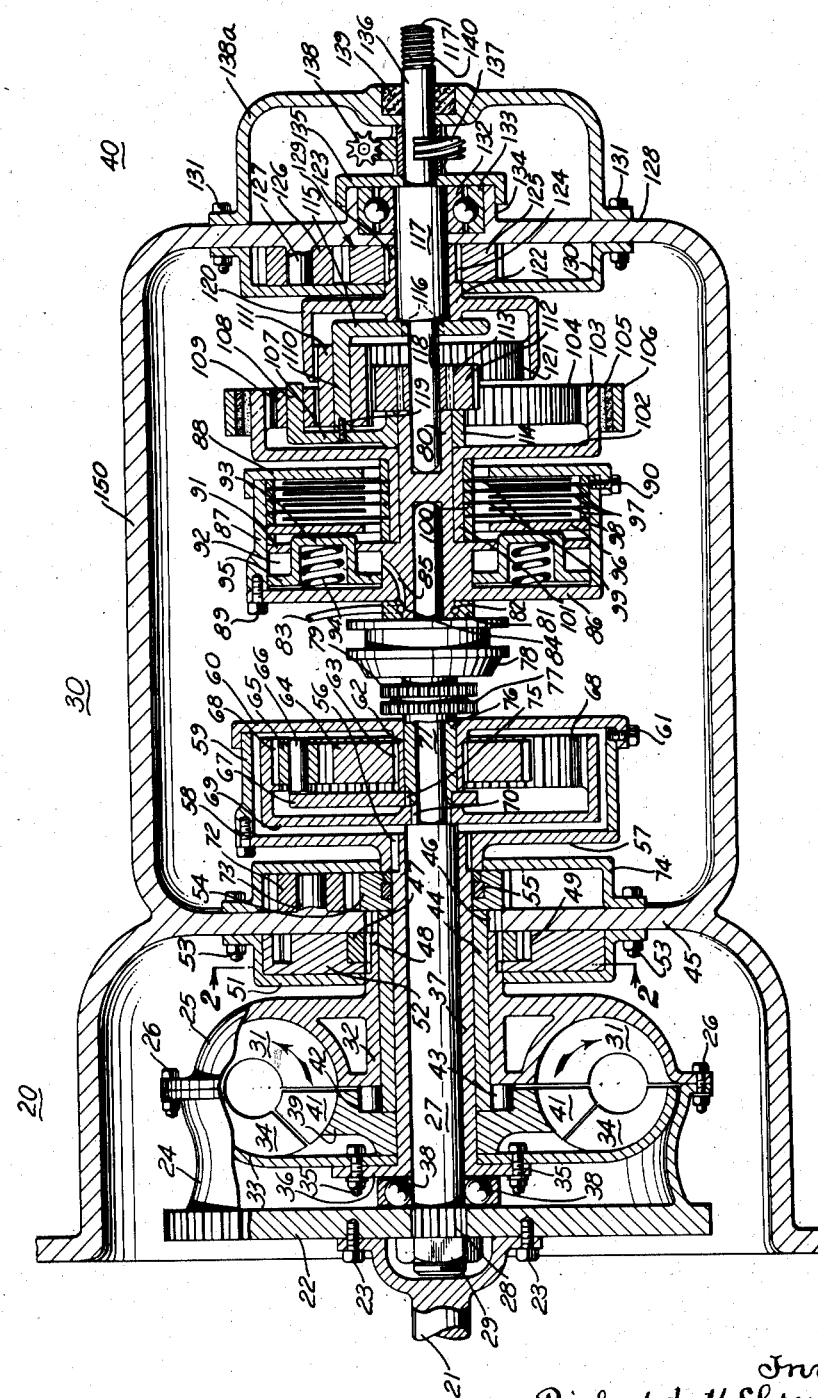
Figure 1 is a vertical section through a transmission embodying the present invention.

Referring now more particularly to the drawings and particularly to Figure 1, the hydraulic drive of this invention is shown as comprising three general sections, a section 20 which contains the hydraulic unit and an engine driven pump, section 30 which contains a front resistance pump, a first planetary gear, a synchromesh clutch and a second planetary gear having a multiple disc clutch and a rear resistance pump and section 40 which contains the speedometer drive shaft and the mounting for the driven tail shaft.

A drive shaft 21 is bolted to the front wall 22 of the fluid assembly casing by means of bolts 23 and the front 24 and rear 25 casing sections are held together by means of the bolts 26. A splined shaft 27 is provided having splines 28 uniting it to the front wall 22 to which it is affixed by means of a nut 29 thus mounting the shaft 27 for rotation with the front wall 22. Integral with the rear casing 25 is an impeller 31 which is also formed integrally with the tubular shaft 32. A follower or rotor 33 having blades 34 is provided within the casing 24, the carrier of which is bolted by means of bolts 35 to a flange 36 upon tubular shaft 37, the thrust of which is taken by the ball bearing 38.

The hydraulic coupling thus described also includes a stator 39 having blades 41. The stator 39 is formed with an annular recess 42 adapted to accommodate one-way rollers 43 which roll upon the tubular shaft 44 and lock the stator to the shaft 44 when the stator attempts to rotate in the reverse direction. This affixes the stator 39 as the shaft 44 is fixed to the wall 45 by splines 46.

The shaft 32 carries at its rear end a gear 47 keyed thereto by means of splines 48. The gear 47 meshes with an annulus gear 49, see Figure 2, which is revolved in an eccentric slot 50 formed in the pump body 52. The casing 51 of the pump is attached by bolts 53 to the wall 45.

Entering the middle section, the shaft 37 towards its rear end is provided with a gear 54 which is mounted upon the shaft 37 with one-way rollers 55 which permit the gear to rotate forward freely. The rear end of the shaft 37 is keyed by splines 56 to a disc 57 forming part of the casing of a planetary gear system. The disc 57 is connected by studs 58 to the casing 59 which in turn is attached to the rear wall 60 by means of studs 61. Rear wall 60 has a forwardly extending flange 62 formed integrally therewith and comprising a collar forming a hub which is attached by splines 63 to a sun gear 64. The sun gear 64 meshes with planet gears 65 carried by studs 66 mounted on the planet carrier 67. The planets 65 in turn mesh with the teeth of an annulus gear 68. The disc 69 carrying the annulus gear 68 is attached by splines 70 to a reduced portion 71 of the shaft 27.

Meshing with the gear 54 which, as above-described, is mounted upon the tubular shaft 37 by means of one-way rollers 55, are pinions 72 carried by studs 73 formed upon the wall 45. The assembly just described is mounted within a pump casing 74 bolted to the wall 45 by means of the bolts 53. As hereinafter described, oil is supplied to the pump thus formed from a transmission sump and is forced by the pump to the control cylinder.

The planet carrier 67 is keyed by splines 75 to a sleeve 76 which is mounted upon the shaft 71 and which at its rear end is provided with teeth 77 adapted to engage a synchromesh collar 78. An intermediate ring 79 is provided for synchronizing in the usual manner. The collar 78 is splined by splines not shown to a shaft 80. The shaft 80 carries a collar 81 provided with an internal annular slot 82 which serves to admit hydraulic fluid from a conduit 83 to a slot 84 on the shaft 80 and thence by means of the passage 85 into the hydraulically operated clutch hereinafter described.

This clutch comprises a front wall 86 carried by and integral with the shaft 80, a casing 87 and a rear wall 88. The front wall 86 is secured to the casing 87 by means of studs 89 and the rear wall is secured to the casing 87 by means of the studs 90. Integral with the casing 87 is a partition 91 forming the rear wall of a cylinder 92 in which is positioned a piston 93. The piston 93 is biased rearwardly by a spring 94 tending to keep the clutch engaged. The passage 85 communicates with the interior of the cylinder 92 on the side to the rear of the flange 95 of the piston 93 and thus serves to declutch the clutch upon the application of hydraulic pressure. The clutch is a multiple disc clutch comprising a heavy plate 96 and thin outer plates 97. The heavy plate 96 and the thin outer plates 97 are carried by splines 98 on the casing 87 and interleave with plates 99 carried by splines 100 on the hub collar 101 which is rotatively mounted upon the shaft 80. The hub collar 101 is integral with a plate 102 and a rim 103. The rim 103 is provided with the internal gear teeth 104 forming an annulus gear and is also provided with an outer surface 105 to which a brake 106 is applied.

A planet carrier 107 is rotatively mounted on the shaft 80 and provided with studs 108 which mount the outer planets 109 and studs 110 which mount the inner planets 111. The outer planets 109 engage and mesh with the annulus gear 104 and also with the inner planets 111. The inner planets 111 mesh with a sun gear 112 which is attached by splines 113 on the end of the shaft 80.

The planet carrier 107 is rotatively mounted by a hub 114 on the shaft 80 and also by a plate 115 which is splined as at 116 to a reduced portion 118 of the tail shaft 117. The two portions of the planet carrier are attached by screws 119. Rotatively mounted upon the tail shaft 117 is a second annulus drum 120 carrying internal gear 121 meshing with the inner planets 111. The hub 122 of the drum 120 has an extension 123 having splines 124 which carry a gear 125. The gear 125 meshes with a pinion gear 126. The pinion gear 126 is carried by a stud 127 formed upon the rear wall 128 of the gear box. The assembly just described comprises a gear pump 129 the gears of which are confined by a close fitting wall 130 which wall is attached to the wall 128 of the gear box by bolts 131. The tail shaft 117 is provided with a ball bearing comprising an inner bearing race 132, an outer bearing race 133 positioned within the outstanding flange 134 formed upon the rear gear box wall 128 and held within said flange by means of the screw cover 135. A reduced portion 136 of the tail shaft 117 is provided with a one-way worm drive disc 137 which meshes with a cross shaft 138 which may be utilized to drive the speedometer and also to drive the centrifugal mechanism, shown in Figure 12. A cover plate or casing 138a is provided being held to the rear gear box wall 128 by the bolts 131 and a felt oil retaining ring 139 is carried by the cover plate 138a as shown. The end of the tail shaft 117 is threaded as at 140 for connection to a universal joint. The entire assembly above-described is housed in a gear box housing 150 which, as indicated above, comprises the three sections 20, 30 and 40.

Figure 2:
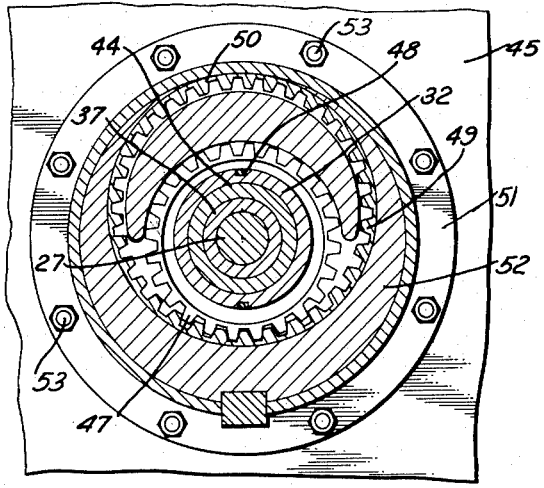
Figure 2 is a section taken along the lines 2—2 in Figure 1.

Referring now more particularly to Figure 2, there is shown therein a cross section of the gear pump 51. The body 52 closely houses the gear 47 and the annular gear 49 which runs in the eccentrically located slot 50. The fluid drawn from the transmission sump 151 by this pump is drawn through a conduit not shown and is forced by the pump through conduit 196 (Figure 6) to the control cylinder 154.

Figure 5:
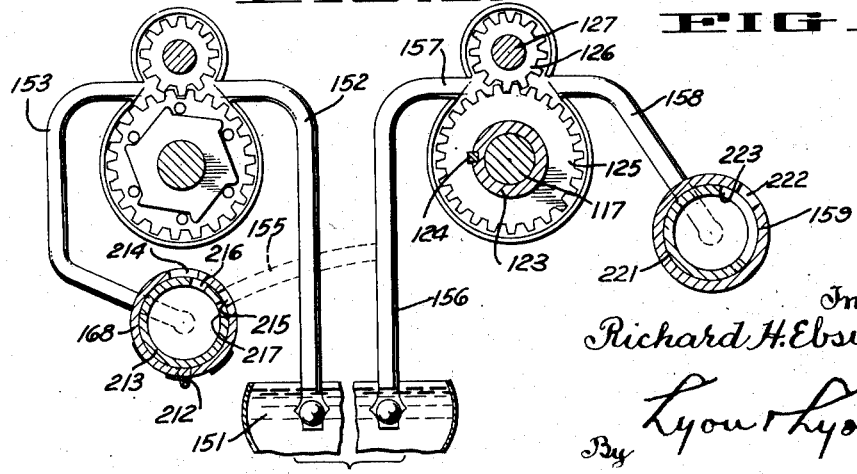
Figure 5 is a diagrammatic representation of the gear pumps utilized in the present invention.

Referring now to Figure 5, there is diagrammatically shown the front and rear resistance pumps 74 and 129. The front resistance pump has a conduit 152 leading to the transmission sump 151 and a discharge conduit 153 communicating with the control cylinder 168. A by-pass 155 shown in dotted lines on Figure 5, may be provided. The second resistance pump has an intake conduit 156 to which the by-pass 155 may be attached as shown in dotted lines. The intake conduit 156 communicates with the rear resistance pump as at 157. The rear resistance pump is provided with a discharge conduit 158 communicating with the control cylinder 159. The discharge 158 may be provided with a relief valve not shown to prevent sudden excess build up of pressure.

Figures 4, 6:
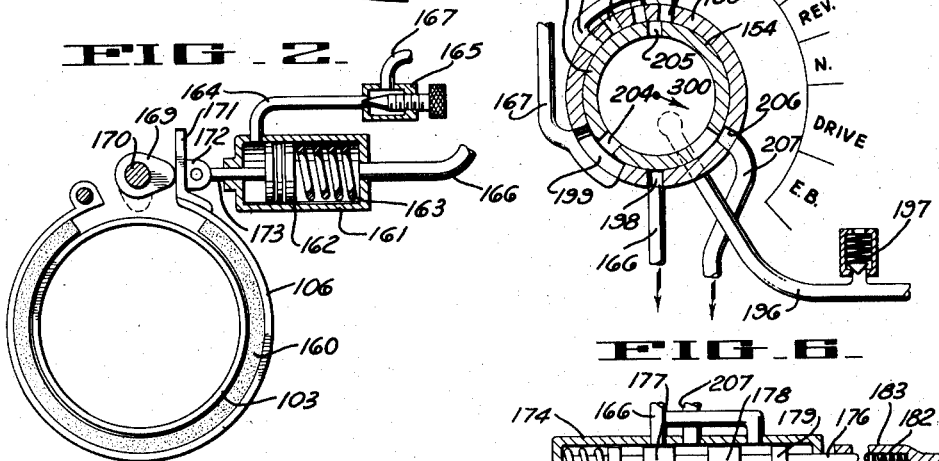
Figure 4 is a fragmentary view partly in section showing details of the brake member.
Figure 6 is a section diagrammatically illustrating the control cylinder utilized for control of the hydraulic pressure as applied to the fluid operated clutches and the brake cylinder.

Referring now to Figure 4, there is shown the brake band 106 having a fabric lining 160 which bears upon the rim 103 for braking annular gear 104 when lack of pressure in the cylinder 161 allows the piston 162 to travel within the cylinder 161 under the influence of the coil spring 163. Hydraulic pressure, however, can be admitted into the cylinder 161 by means of the conduit 164 under the control of needle valve 165. Conduit 166 is provided by means of which hydraulic pressure can be admitted into the cylinder 161 on the other side of the piston 162 to reinforce the action of the spring 163. The purpose of the needle valve 165 is to regulate the rapidity of application of the brake 106. The conduit 167 communicates with the control cylinder 154 and the conduit 166 also communicates with the control cylinder 154.

A cam 169 mounted on a shaft 170 is provided adapted to engage an extension 171 at the end of the brake band 106. The extension 171 is also provided with a clevis 172 to which is pivotally attached the piston rod 173.

Figure 7:
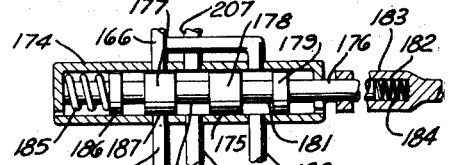
Figure 7 is a vertical section illustrating a control mechanism provided for the purpose of freewheeling.

Referring now more particularly to Figure 7, there is shown a throttle operated device for the accomplishment of free wheeling. In this case a cylinder 174 is provided having a piston 175 mounted therein. The piston 175 is provided with a shaft 176 and the piston itself is formed of three sections, 177, 178 and 179 having reduced or shaft portions 180 and 181 intermediate thereof. The shaft 176 extends out of the cylinder 174 and is provided with an operating rod or handle 182. The end of the operating rod is enlarged at 183 to house an overriding spring 184. The other end of the shaft 176 is provided with a coil spring 185 adapted to about a piston portion 186. The operating rod 182 is connected to the throttle of the engine and is adapted to move to the left, Figure 7, upon closing of the throttle. In this movement it overcomes the spring 185, closes the port 187 and opens the ports 188 and 189, i. e. the condition shown in Figure 7.

Referring now to Figure 6, the control cylinder 154 is shown. This control cylinder comprises an outer casing 190 and an inner sleeve 191. The inner sleeve 191 is adapted to be actuated by a rod 192 (see Figure 9) which forms a link between the control shaft 193 and the sleeve, being pivotally connected to ears 194 on the rod 192 and ears 195 operably connected to the sleeve. Oil is supplied to the interior of the control cylinder 154 through conduit 196 and the maximum pressure maintained in the cylinder is controlled by a relief valve 197. The conduit 196 is connected to the output of the front pump 51 which supplies operating pressure.

The control cylinder 154 is provided with a port 198 which opens to conduit 166 which supplies brake boosting pressure to the right of the piston in the cylinder 161, Figure 4. The control cylinder 154 is also provided with a port 199 which is adapted to open to conduit 167 to provide brake releasing pressure on the other side of the piston 162 in the cylinder 161. The control cylinder 154 also is provided with ports 200, 201 and 202. Ports 200, 201 and 202 are connected by a header 203 to the conduit 83 which supplies pressure to the passage 85 and hence to the clutch releasing piston 93. The inner sleeve 191 is provided with ports 204 and 205 to variably route oil under pressure to the conduits 167, 83 and 166. The control cylinder 154 is also provided with a port 206 which opens to a conduit 207 which connects with the cylinder 174. The conduit 207 passes through the cylinder 174 as shown and communicates with the conduit 188 leading to line 83 by a connection not shown in order to supply pressure to the line 83 for disengaging the rear clutch in free wheeling, as will be hereinafter described. The control cylinder 154 is also provided with a conduit 209 used to operate the front clutch shown in the modification Figure 3.

Referring now more particularly to Figures 8, 9, 10, 11 and 12 there is shown a control shaft 193 which is used for operating the various controls of this invention. The connection between the control shaft 193 and the control cylinder 154 has been described above. The control shaft 193 is provided with ears 210 to which are pivoted one end of a link 211 the other end of which is attached to ears 212 operably connected to the sleeve 213 of the control cylinder 168. The cylinder 168 has an exhaust port 214 and, as indicated in Figure 5, may be provided with a secondary exhaust port 215 for use in connection with the by-pass 155. The sleeve 213 is similarly provided with a port 216 for cooperation with the port 214 and may also have a port 217 for communication with the by-pass 155. The cylinder 168 is preferably associated with the gear casing 150 so that oil expelled from the exhaust port 214 can be used as a spray to lubricate the revolving parts of this invention.

The rocker shaft 193 is also provided with ears 218 to which are connected one end of a link 219, the other end of which is pivotally connected to ears 220, which ears 220 are operably associated with the sleeve 221 of the control cylinder 159. The control cylinder 159 has an exhaust port 222 and the sleeve 221 has a cooperating port 223. Like the control cylinder 168 the control cylinder 159 may also be operably associated with the gear box casing 150 to utilize the discharge of oil from the exhaust port 222 for lubricating the gear box.

The control shaft 193 is also provided with a cam 224 over which there is adapted to ride a cam follower 225 in the form of a roller pivotally connected to one arm of a bell crank 226. The bell crank 226 is pivoted as at 227 and has its upper end 228 bifurcated in the form of a yoke, which yoke is adapted to operatively connect with the channel 229 in the synchromesh collar 78. A coil spring 230 is provided having one end connected to the lower arm 231 of the bell crank 226 and the other end connected under tension to a fixed portion of the gear box, thus tending constantly to pivot the arm 231 about the pivot point 227 and to force the cam follower 225 into contact with the cam 224 or in the absence of said cam, into contact with the lower side of the control rod 193. A dashpot 232 may be provided to prevent snap action of the clutch collar 78. As indicated, the dashpot 232 may comprise a cylinder 233 having a round-ended piston 234 disposed therein having its outer end in contact with the arm 226. The piston 234 on its inner end abuts a coil spring 235 and a bleed opening 236 is provided in the end of the cylinder.

Referring now more particularly to Figures 11 and 11A, there is shown a brake control mechanism in which a cam 237 is provided on the control shaft 193 adapted to cooperate with a cam follower 238 in the form of a roller pivotally mounted on one end of an arm 239 of a bell crank 240. The bell crank 240 is pivotally mounted as at 242 and the other arm thereof 241 is pivotally connected to a link 243. The bell crank 240 is biased in a clockwise position by means of a coil spring 244 attached to the arm 241 at one end and having the other end fixedly connected so as to apply tension on the arm 241. A second cam 245 is provided upon the control rod 193 for the purpose hereinafter described.

Referring to Figure 11A, the mechanism shown inside the phantom lines of Figure 11 is at right angles to that shown in Figure 11A. The link 243 in such figure is pivotally connected as at 246 to an arm 247 operatively attached to a cross shaft 248. The shaft 248 carries brake operating cam 249 adapted to engage the extension 171 on the brake shoe 106 and release the brake.

As will be hereinafter described, the two cams 237 and 245 are operated selectively in push-pull start and tow to release the brake.

The shaft 138 driven by the worm 137 is extended to one side of the gear box where it engages a second worm 250 which drives a shaft 251. Mounted on the outer end of the shaft 251 is a centrifugal governor 252 adapted on rapid rotation to expand and pull the upper end 253 of a balance arm 254 in a counterclockwise direction as shown in Figure 12. The worm 250 may be provided with one way clutch mechanism (not shown) to prevent operation in reverse. The upper end of the arm 253 is pivotally connected to a link 255. A coil spring 256 is attached to the link 255 to normally bias the upper end of the arm 253 in a clockwise direction. The link 255 is pivoted as at 299 to the arm 257 of a bell crank 258. The bell crank 258 is pivoted as at 259 and its upper arm 260 is pivoted as at 261 to an arm 262. The arm 262 is pivoted as at 263 to an upstanding arm 264 of a bell crank latch 265. The bell crank latch 265 is pivoted on a shaft 266 and its normally horizontal arm 267 has a latch 268 formed upon the end thereof adapted in latching position to engage the upper end of the extension 171 of the brake shoe 106 and latch the brake in nonbraking position.

Figure 3:
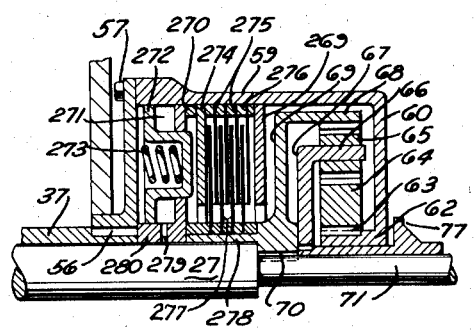
Figure 3 is an enlarged fragmentary vertical section through a portion of the first planetary gear showing a modification in which is provided a clutch for locking together the members as a unit.

Referring now more particularly to Figure 3 there is shown therein an alternative embodiment of the front planetary gearset in which a clutch is provided for locking the mechanism together for rotation as a unit which is desirable when the vehicle is in full forward drive. This eliminates any slip in the hydraulic coupling. The disc or forward wall 57 is as before splined to the shaft 56 but the casing 59 is enlarged to accommodate the clutching mechanism hereinafter described. The casing 59 has built integrally therewith a partition 269 forming a clutch housing. The clutch of this mechanism is generally similar to the clutch 87 illustrated in Figure 1 with respect to the rear planetary gearset and the partition 269 is analogous to the rear wall 88 shown therein. The clutch includes a partition 270 similar to the partition 91 which forms the rear wall of a cylinder 271 similar to the cylinder 92. A piston 272 is disposed within the cylinder 271 similar to the piston 93 and a coil spring 273 similar to the spring 94 is provided tending normally to bias the clutch into clutching position. The clutch comprises a heavy plate 274 and a plurality of thin plates 275 splined to the housing 59 as at 276. A corresponding plurality of thin plates 277 are interleaved between the plates 275 and splined to the hub collar 278 which is similar to the hub collar 101. The hub collar 278 is integral with the disc 69 similarly to the hub collar 101. A passage 279 is provided in a hub 280 formed on the partition 270 which passage is adapted to communicate with a source of hydraulic fluid under pressure (not shown). It will be readily seen by those skilled in the art that various expedients may be resorted to for providing communication to the passage 279, as for instance the shaft 27 may be bored to provide such a communication.

Referring to Figure 6, the conduit 209 which is adapted to register with the port 205 is placed, when it is desired to release the clutch, in communication with the passage 279 and fluid under pressure is communicated to the interior of the cylinder 271 to the rear of the piston, which overcomes the force of the coil spring 273 and releases the clutch.

The operation of the above-described device is as follows: Torque from the drive shaft 21 is imparted to the front wall 22 and from the front wall 22 to the shaft 27 and the reduced portion 71 thereof. This direct drive, by reason of the spline connection 70 with the disc 69, is imparted to the annulus 68 of the first planetary gearset. The driving of this annulus would normally tend to rotate the planets 65 about the sun gear 64 but as the load of the automobile is applied to the planet carrier 67 the planets do not rotate about the sun gear but revolve upon their axes and thus impart reverse rotation to the sun gear 64. The sun gear 64 is keyed to the collar 62 by means of the splines 63 and thus this reverse rotation is imparted to the rear wall 60, the casing 59 and the front disc 57. As the front disc 57 is splined as at 56 to the shaft 37, reverse rotation is imparted to the shaft 37. The reverse rotation thus imparted to the shaft 37 is imparted by means of the one-way rollers 55 to the sun 54 of the first resistance pump 74 causing this pump to work.

Simultaneously, the rotation of the front wall 22 is imparted through the casing 24 and 25 to the shaft 32 and as this shaft 32 is keyed to the gear 47 of the pump 51, the pump 51 is placed in operation and fluid under pressure is passed to the control cylinder 154.

The reverse rotation imparted to the shaft 37 is also imparted through the flange 26 to the follower 34 of the hydraulic coupling. This reverse rotation is possible at low speeds because of the negligible amount of coupling in the hydraulic coupling. It will be appreciated that the impeller 31 being affixed to the casing 25 is rotating forwardly.

As above-described, the reverse rotation of the shaft 37 has been applied through the one-way rollers 55 to the gear 54 of the front resistance pump 74. Load may be applied to the front resistance pump 74 by means of the control cylinder 168. The sleeve 213 of this cylinder may be rotated by movement of control shaft 193, transmitted through link 211 to ears 212 to close the discharge 214 of this pump as desired thus applying a desired amount of load to the front resistance pump. As this load is applied, resistance to the reverse rotation of the shaft 37 and consequently of the sun gear 64 is variably applied. As the sun gear 64 is therefore restricted in its free reverse rotation, the planet carrier 67 is caused to gradually rotate forwardly revolving the planet gears 65 about the sun gear 64 and thus imparting drive to the shaft 76. Selectively applying the load upon the front resistance pump variably controls what in effect may be termed the gear ratio between the drive of the drive shaft 21 and this drive of the shaft 76.

The torque thus selectively applied to the shaft 76 is transferred to the shaft 80 by coupling the synchromesh clutch 78. The clutch 78 however, may be disengaged to permit racing the engine for testing purposes without the consequent creep that would be imparted to the automobile through the hydraulic coupling.

The torque thus applied to the shaft 80 is imparted to the sun gear 112 which is splined thereon at 113 and if the clutch formed by the plates 96, 97 and 99 is engaged so as to lock the second planetary gearset as a unit, this direct drive is imparted through the planet carrier 107 and the plate 115 through splines 116 to the tail shaft 117. However, for reverse purposes hydraulic pressure is applied through the line 83, through the passage 85 to the cylinder 92 to release the clutch mechanism 96, 97 and 99. The releasing of this clutch mechanism 96, 97 and 99 permits the second planetary gearset to operate, in which case drive is imparted through the sun gear 112 to the planetary gears 111, from the planetary gears 111 to the plentary gears 109 to the annulus 104.

The application of the brake 106, to prevent what would otherwise be the idle rotation of the annulus 104, causes the planet carrier 107 to revolve backwardly. As this planet carrier is attached through the splines 116 to the tail shaft 117, thus reverse drive is imparted to the tail shaft 117.

As the speed of the engine increases, coupling commences between the impeller 31 and the follower 34 which coupling gradually builds up until substantially complete coupling is acquired. As this is being done the reverse action of the shaft 37 is overcome, the front resistance pump 74 becomes inactive because of the one-way rollers 55. At the point in which the forward rotation of the rotor 34 approaches the forward rotation of the impeller 31, a one-to-one drive is approached and the planet carrier 67 is then revolving forwardly at approximately the same rate as the drive shaft 21.

Referring now to Figure 3 in the embodiment there shown, if in the condition last described wherein the ratio of the drive of the planet carrier 67 and the drive shaft 21 approaches one-to-one, the clutch mechanism there described is engaged by releasing hydraulic pressure from the passage 279, the various components of the front planetary gearset are locked as a unit and a one-to-one drive insured.

The stator 41 described in connection with the hydraulic coupling means is provided in order to smooth out the hydraulic coupling characteristics of the device in the well-known manner.

By reason of the annulus drum 120 meshing with the inner planets 111 which are driven by the sun 112, rotation is imparted through the splines 124 to the gear 125 of the rear resistance pump. In ordinary operation the exhaust outlet of this rear resistance pump through the control cylinder 159 is wide open so as to offer no resistance to the flow of fluid from the pump. However, for hill braking purposes the outlet 222 may be variably restricted thus offering controlled resistance to the rear resistance pump 129. Such controlled resistance is imparted backwards through the gear 125. This controlled resistance can be utilized in two ways. The clutch 78 can be disengaged thus freeing the engine, the clutch formed by the plates 96, 97 and 99 may be engaged thus locking the rear planetary gear set together as a unit in which case the rear resistance pump operates directly upon the tail shaft 117 as a simple resistance brake.

In the alternative the clutch 78 may be left engaged, the clutch formed by the plates 96, 97 and 99 disengaged to permit the rear planetary gearset to operate. In such case the resistance imparted by the rear resistance pump is communicated directly back through the mechanism to the engine and causes the engine to form an engine brake.

It will be noted that the control of the clutch 96, 97 and 99 associated with the rear planetary gearset, the clutch shown in Figure 3 and the brake of Figure 4 are dependent upon a source of hydraulic fluid under pressure supplied by the main pump 51. As this pump 51 will be inoperative if the engine ceases to operate, it is apparent that when the engine is shut off both of the clutches are engaged and the brake 106 is applied under the force of the coil spring 163, hence the automobile is automatically braked whenever the engine stops. This is a useful fact upon parking of the automobile. However, in the event the engine fails when the automobile is traveling at a rapid rate of speed it would be undesirable to have the brake automatically applied. For this reason, the centrifugal governor 252 is provided which is so designed that at above speeds of approximately four or five miles per hour the latch 268 is in the position shown in Figure 11 thus latching the brake 106 out of braking position. When the speed of the automobile decreases below four or five miles per hour, the action of the centrifugal governor 252 is insufficient to position the latch in the path of the extension 171 over the force of the coil spring 256.

When the transmission of this invention is in forward drive and a free wheeling or coasting action is desired, this is accomplished by means of the mechanism shown in Figure 7. The rod 182 is operably connected to the throttle of the engine and when the throttle is closed the rod moves to the position shown in Figure 7 closing the port 187 communicating with the line 196. This removes boosting pressure from the piston 162 and permits the pressure in the line 167 to release the brake 106. However, port 188 is open, which communicates with the conduit 83 and disengages the rear clutch thus permitting the rear planetary gearset to run idly. The port 189 communicates with the line 167 by connection (not shown) and assures release of the brake 106. In Figure 8, an operator's hand lever 301 is shown, which serves to operate sleeve 213 through link 303, lever 304, shaft 193, link 211 and ear 212 attached to said sleeve 213. Lever 301 is shown fulcrumed at 302 and serving to actuate, through a link 303, a swinging lever 304, fulcrumed at 306 and fitted with a slot 305 which embraces a pin 307 carried by the control shaft 193.

The control cylinder 154, receiving fluid pressure from the pump 51, controls the operation of the hydraulically actuated members so as to selectively position the transmission either in ordinary brake, in reverse, neutral, forward drive or engine brake. The arrow 300, Figure 6, indicates the condition of the device. Thus with the car stationary, the engine not running and the hand lever 301 in neutral, the supply of fluid to line 83 is interrupted and the rear clutch is engaged. The supply of fluid to the brake 106 is similarly interrupted and the brake 106 is applied by the spring 163. The control cam 224 is so designed that in this position the clutch 78 is disengaged and then the operator is free to start the engine and speed it up if desired. Moving lever 301 into the "drive" position causes the port 204 to align with port 199 and pressure is supplied to conduit 167 to release the brake 106. Port 205 momentarily aligns with port 201, thus releasing for a moment the rear clutch and so easing the engagement by cam 224 of the clutch 78. Moving lever 301 still further into the drive position, with the clutch 78 now engaged, the port 205 closes and the rear clutch becomes engaged. The gear ratio in the drive through the transmission is now determined by the degree of opening of the port 214 which allows escape of fluid from the front resistance pump.

In reverse the rear clutch is disengaged by application of fluid pressure to the line 83 to permit the rear gearset to operate and the brake 106 is applied. The annulus thus being held, the planets impart reverse rotation to the tail shaft 117.

In the event the automobile is stalled and it is desired to start the automobile by a push or a pull from another car, the control is placed in the direct drive position but the brake 106 is held off by the cam 249. All of the clutches are engaged and thus a direct connection is made to the engine for turning the engine over by means of the force applied to the tail shaft.

In engine braking the same conditions as used for a push start may be used. However, an alternative method is possible in which the rear clutch is disengaged by fluid applied to the line 83 and the rear resistance pump 129 begins to function, gradually increasing the retardation of the annulus 120 as the port 222 is closed. The control of the annulus 120 permits a control of the gear ratio as the load on this annulus causes the carrier 115 to roll the planets 109 on the annulus 104. When the outlet 222 of the rear resistance pump is completely closed, the gear ratio thus defined approximates that of first gear in a conventional drive. In this condition application of the brake 106 and re-engagement of the rear clutch will bring the car to a stop.

While there has been described a preferred embodiment of the present invention, it will be appreciated by those skilled in the art that various changes and modifications can be made therein without departing from the essence of the invention and it is intended to cover herein all such changes and modifications as come within the true spirit and scope of the appended claims.

What is claimed is:

1. In a power transmission in a motor vehicle, in combination: a brake and a brake drum; a driven tail shaft; a planetary gear set; said gear set having a sun gear, planetary gears, a planet-carrier and a ring gear; a connection from said drum to a member of said gear set; a power driven pump supplying fluid under pressure; spring means constantly tending to apply said brake to hold said drum from rotation; mechanism operated by said fluid pressure and serving to restrain said brake from action; a connection from said planet-carrier to said tail shaft; clutch means to lock the members of said gear set for rotation as a unit; spring means constantly tending to apply said clutch means; mechanism operated by said fluid pressure and serving to release said clutch; said first spring means automatically acting to apply said brake and said second spring means automatically acting to apply said clutch when said mechanisms fail to receive said fluid pressure; said automatic action serving to hold said tail shaft and said vehicle stationary.

2. A power transmission as set forth in claim 1, including centrifugal means operatively associated with said tail shaft and adapted to render said brake inoperative during substantial rotation of said tail shaft.

3. A power transmission as set forth in claim 1, including a drive shaft operatively connected with said gear set, said drive shaft being also held stationary by said automatic action of said brake and said clutch means when said fluid pressure fails to be supplied to said mechanisms.

4. In a power transmission in a motor vehicle in combination: a drive shaft and a driven shaft; a brake and brake drum; a pump supplying fluid pressure; a planetary assembly having a sun gear, planet gears, a planet-gear carrier and a ring gear; said drive shaft being connected to a first member of said assembly; said driven shaft being connected to a second member of said assembly; said brake drum being connected to a third member of said assembly; clutch means serving to connect two members of said planetary assembly and thereby to lock the members of said assembly for unitary rotation; and to connect said brake drum and said drive and driven shafts; spring means normally tending to engage said clutch means; hydraulic mechanism actuated by said fluid pressure to release said clutch means and serving to disconnect said brake drum from said drive shaft and from said driven shaft; spring means constantly biasing said brake to engagement with said brake drum; hydraulic mechanism actuated by said fluid pressure and serving to restrain said brake from engagement with said brake drum; whereby the first said spring means automatically makes the connection between said brake drum and said drive and driven shafts and the second said spring means automatically engages said brake with said brake drum when said hydraulic mechanisms fail to receive fluid pressure.

5. A power transmission as set forth in claim 4 including centrifugal means operatively associated with said driven shaft and adapted to render said brake inoperative upon substantial rotation of said driven shaft.

6. In a power transmission, in combination: a brake and a rotating member; a pump supplying fluid pressure; a spring means constantly tending to apply said brake to check the rotation of said rotating member; hydraulic mechanism operated by said fluid pressure and serving to restrain said brake from application; a second rotating member; braking means serving to check the rotation of the said second rotating member; a final driven shaft; gear members connecting the said rotating members to one another and to the said driven shaft; whereby, when the rotation of the said second rotating member is checked by its associated braking means and failure of fluid pressure causes the application of the first said brake, the said gear members and the said final driven shaft are checked from rotation; and manually operated means serving mechanically to restrain the first said brake from application when said fluid pressure is not available.

7. A power transmission as set forth in claim 4 including: manually operated means serving mechanically to restrain the said brake from application when the said fluid pressure is not available.

8. A power transmission as set forth in claim 4, wherein the said drive shaft is connected to the said sun gear; and including a gear member operably associated with the said planetary assembly; braking means serving to check the rotation of the said gear member and thus to provide a reaction gear, thereby conditioning the said planetary assembly to furnish a reduced drive between said drive and said driven shafts.

9. A power transmission as set forth in claim 8 including: manually operated means serving mechanically to restrain said first brake from engagement when said fluid pressure is not available.

10. A power transmission as set forth in claim 8 wherein said planet gears include a first series of gears meshing with said sun gear and a second series of gears meshing with the first said series and with the said ring gear.

11. A power transmission as set forth in claim 8 including an engine-driven shaft; a front planetary gear assembly having a front sun gear, front planet gears, a front planet-gear carrier and a front ring gear; said engine-driven shaft being connected to said front ring gear; an intermediate shaft connected to said front carrier; braking means serving to check the rotation of said front sun gear; and serving to provide a reduced drive through said front assembly; a central clutch serving to connect and disconnect said intermediate shaft and the first said drive shaft; and manual means for the operation of said central clutch.

12. A power transmission as set forth in claim 11 wherein gears of said front planetary assembly are enclosed to form a fluid pump; and including a manual control for said latter pump serving to control the flow therefrom so that a varying degree of torque is transmitted from said engine-driven shaft to said intermediate shaft.

13. A power transmission as set forth in claim 8 including centrifugal means operatively associated with said driven shaft and serving to restrain said brake from engagement during substantial rotation of said driven shaft.

14. A power transmission as set forth in claim 1 including manually operated means serving to mechanically restrain said brake from application.

15. A power transmission as set forth in claim 1 wherein said planetary gears include a first series of planet gears meshing with said sun gear; and a second series of planet gears meshing with said first series and with the said ring gear.

16. A power transmission as set forth in claim 1 including an engine-driven shaft; a front planetary gear assembly having a front sun gear, front planet gears, a front planet-gear carrier and a front ring gear; said latter shaft being connected to said front ring gear; an intermediate shaft connected to said front carrier; braking means serving to check the rotation of said front sun gear; and serving to provide a reduced drive through said front assembly; a central clutch serving to connect and disconnect said intermediate shaft and the first said drive shaft; and manual means for the operation of said central clutch.

17. A power transmission as set forth in claim 16 wherein gears of said front planetary assembly are enclosed to form a fluid pump; and including a manual control for said pump serving to regulate the flow therefrom so that a varying degree of torque is transmitted from said engine-driven shaft to said intermediate shaft.

18. A power transmission as set forth in claim 4 wherein said planet gears include a first series of gears meshing with said sun gear; and a second series of gears meshing with the first said series and with the said ring gear.

19. A power transmission as set forth in claim 4 including an engine-driven shaft; a front planetary gear assembly having a front sun gear, front planet gears, a front planet-gear carrier and a front ring gear; said latter shaft being connected to said front ring gear; an intermediate shaft connected to said front carrier; braking means serving to check the rotation of said front sun gear; and serving to provide a reduced drive through said front assembly; a central clutch serving to connect and disconnect said intermediate shaft and the first said drive shaft; and manual means for the operation of said central clutch.

20. A power transmission as set forth in claim 19 wherein gears of said front planetary assembly are enclosed to form a fluid pump; and including a manual control serving to regulate the flow therefrom and thereby to cause a varying degree of torque to be transmitted from said engine-driven shaft to said intermediate shaft.

21. A power transmission as set forth in claim 6 including centrifugal means operatively associated with said final driven shaft and adapted to render said brake inoperative during substantial rotation of said driven shaft.

22. A power transmission as set forth in claim 6 including an engine-driven shaft; a front intermediate shaft; a planetary assembly serving to provide a reduced drive between said engine-driven shaft and said front intermediate shaft; a rear intermediate shaft; a manually controlled clutch serving to connect the said intermediate shafts; and a manually controlled fluid operated clutch serving to connect said rear intermediate shaft to the first said rotating member.

23. A power transmission as set forth in claim 6 wherein said second rotating member is operably associated with gear members to form a fluid pump; control means for the flow from said latter pump serving to furnish the said braking means; and a manual control enabling the operator of the vehicle to regulate said flow and thereby to vary the action of the said braking means; said variation serving to determine the resistance offered to the rotation of the said second rotating member.

RICHARD H. EBSWORTH.

References Cited in the file of this patent

UNITED STATES PATENTS

| Number | Name | Date |
|---|---|---|
| 680,825 | Westinghouse | Aug. 20, 1901 |
| 1,161,066 | Minor | Nov. 23, 1915 |
| 1,660,997 | Kearby | Feb. 28, 1928 |
| 1,839,088 | De Normanville | Dec. 29, 1931 |
| 1,958,356 | Webb | May 8, 1934 |
| 2,147,528 | Fottinger | Feb. 14, 1939 |
| 2,182,386 | Patterson | Dec. 5, 1939 |
| 2,203,546 | Pollard | June 4, 1940 |
| 2,212,046 | Ross | Aug. 20, 1940 |
| 2,231,966 | Swennes | Feb. 18, 1941 |
| 2,324,733 | Smirl | July 20, 1943 |
| 2,350,810 | Pentz | June 6, 1944 |
| 2,371,371 | Watson | Mar. 13, 1945 |
| 2,402,248 | Hale | June 18, 1946 |
| 2,444,279 | Bruce et al. | June 29, 1948 |
| 2,473,638 | Cumming | June 21, 1949 |